(12) United States Patent
Ryan et al.

(10) Patent No.: US 8,259,939 B2
(45) Date of Patent: *Sep. 4, 2012

(54) SYSTEM AND METHOD FOR ALLOWING COPYING OR DISTRIBUTION OF A COPY PROTECTED SIGNAL

(75) Inventors: John O. Ryan, Woodside, CA (US); Ronald Quan, Cupertino, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,463

(22) Filed: Jan. 10, 2011

(65) Prior Publication Data

US 2011/0107438 A1   May 5, 2011

Related U.S. Application Data

(63) Continuation of application No. 11/228,757, filed on Sep. 16, 2005, which is a continuation-in-part of application No. 10/968,487, filed on Oct. 19, 2004.

(51) Int. Cl.
*H04N 7/167* (2011.01)
(52) U.S. Cl. .................... 380/203; 380/201
(58) Field of Classification Search .................... None
See application file for complete search history.

(56) References Cited

U.S. PATENT DOCUMENTS

| | | | |
|---|---|---|---|
| 4,631,603 A | 12/1986 | Ryan | |
| 4,914,694 A | 4/1990 | Leonard et al. | |
| 5,194,965 A | 3/1993 | Quan et al. | |
| 5,315,448 A | 5/1994 | Ryan | |
| 5,574,787 A | 11/1996 | Ryan | |
| 5,799,081 A | 8/1998 | Kim et al. | |
| 5,953,417 A * | 9/1999 | Quan | 380/203 |
| 6,381,747 B1 | 4/2002 | Wonfor et al. | |
| 6,404,889 B1 | 6/2002 | Ryan et al. | |
| 6,523,113 B1 | 2/2003 | Wehrenberg | |
| 6,633,723 B1 | 10/2003 | Kuroda et al. | |
| 6,836,549 B1 | 12/2004 | Quan et al. | |
| 6,980,653 B1 | 12/2005 | Sako et al. | |
| 7,050,698 B1 | 5/2006 | Quan | |

(Continued)

FOREIGN PATENT DOCUMENTS

EP   0735752 A2   10/1996

(Continued)

OTHER PUBLICATIONS

"European Application Serial No. 06803548.4, Extended European Search Report mailed Dec. 6, 2010", 11 pgs.

(Continued)

*Primary Examiner* — Kaveh Abrishamkar
(74) *Attorney, Agent, or Firm* — Schwegman Lundberg & Woessner, P.A.

(57) ABSTRACT

A copy protection system and method for allowing copying or distribution of a copy protected signal is disclosed. One embodiment includes an apparatus and method for receiving a content signal via a WiFi communications channel, the content signal including a control signal; and using a modifying circuit coupled with the WiFi communications channel to generate an analog copy protection signal based on the control signal, the control signal causing the modifying circuit to add or delete the analog copy protection signal to or from the content signal.

14 Claims, 5 Drawing Sheets

U.S. PATENT DOCUMENTS

| | | | |
|---|---|---|---|
| 7,784,103 B2 | 8/2010 | Ryan et al. | |
| 7,907,727 B2 * | 3/2011 | Ryan et al. | 380/203 |
| 2002/0012443 A1 * | 1/2002 | Rhoads et al. | 382/100 |
| 2004/0054894 A1 | 3/2004 | Lambert | |
| 2004/0062527 A1 | 4/2004 | Kuroda et al. | |
| 2004/0168075 A1 | 8/2004 | Suh et al. | |
| 2004/0179691 A1 | 9/2004 | Hori et al. | |
| 2005/0084102 A1 | 4/2005 | Hollar | |
| 2006/0083373 A1 | 4/2006 | Ryan et al. | |
| 2006/0085863 A1 | 4/2006 | Ryan et al. | |
| 2006/0110131 A1 | 5/2006 | Okauchi et al. | |
| 2008/0292269 A1 | 11/2008 | Ryan et al. | |

FOREIGN PATENT DOCUMENTS

| | | |
|---|---|---|
| EP | 0969462 A1 | 1/2000 |
| EP | 1298655 A2 | 4/2003 |
| JP | 2000508142 | 6/2000 |
| JP | 200186444 A | 3/2001 |
| JP | 2001512633 A | 8/2001 |
| JP | 2002165178 | 6/2002 |
| JP | 2002524933 | 8/2002 |
| JP | 200323419 A | 1/2003 |
| JP | 2004-007452 | 1/2004 |
| TW | 591651 | 6/2004 |
| TW | 222561 | 10/2004 |
| WO | WO-9737492 A1 | 10/1997 |
| WO | WO-9743853 A1 | 11/1997 |
| WO | WO-9834401 A2 | 8/1998 |
| WO | WO-0013413 A1 | 3/2000 |
| WO | WO-2004081719 A2 | 9/2004 |
| WO | WO-2005073967 A1 | 8/2005 |
| WO | WO-2007035383 A2 | 3/2007 |

OTHER PUBLICATIONS

Bloom, J. A, et al., "Copy Protection for DVD Video", Proceedings of the IEEE, vol. 87, No. 7, (Jul. 1999), pp. 1267-1276.

"U.S. Appl. No. 11/228,757, Notice of Allowance mailed Feb. 3, 2011", 6 pgs.

"U.S. Appl. No. 12/187,191, Non Final Office Action mailed Jan. 31, 2011", 15 pgs.

"Chinese Application Serial No. 094136598, Response filed Jun. 28, 2007", 11 pgs.

"European Application Serial No. 05812506.3, Response filed Apr. 19, 2010 to Office Action mailed Oct. 9, 2009", 8 pgs.

"European Application Serial No. 05812506.3, Response filed Oct. 23, 2009 to Office Action mailed Jun. 15, 2009", 25 pgs.

"European Application Serial No. 05812506.3, Summon to attend Oral Proceeding mailed Jan. 27, 2011", 5 pgs.

"Japanese Application Serial No. 2007-537935, Final Office Action mailed Mar. 8, 2011", 6 pgs.

"Japanese Application Serial No. 2008-531301, Office Action mailed Feb. 22, 2011", 6 Pgs.

"Japanese Application Serial No. 2008-531301, Office Action Response mailed May 12, 2011", 6 pgs.

"Taiwan Application Serial No. 095134143, Office Action mailed May 4, 2011", 5 pgs.

"U.S. Appl. No. 12/187,191 , Response filed Aug. 1, 2011 to Non Final Office Action mailed Jan. 31, 2011", 22 pgs.

"European Application Serial No. 06803548.4, EP Office Action Received Jul. 14, 2011", 6 pgs.

"European Application Serial No. 06803548.4, Extended European Search Report Response Filed Jun. 21, 2011", 17 pgs.

"European Application Serial No. 11003550.8,Extended European Search Report mailed Jul. 26, 2011", 7 pgs.

"Japanese Application Serial No. 2008-531301, Final Office Action mailed Sep. 27, 2011", 9 pgs.

"Taiwanese Application Serial No. 095134143, Office Action mailed May 4, 2011", 5 pgs.

"Taiwanese Application Serial No. 095134143, Office Action Response filed Aug. 8, 2011", 10 pgs.

"U.S. Appl. No. 10/968,487, Examiner Interview Summary mailed Apr. 23, 2010", 2 pgs.

"U.S. Appl. No. 10/968,487, Final Office Action mailed Nov. 24, 2009", 8 pgs.

"U.S. Appl. No. 10/968,487, Final Office Action mailed on Nov. 26, 2008", 11 pgs.

"U.S. Appl. No. 10/968,487, Non-Final Office Action mailed Jan. 9, 2007", 10 pgs.

"U.S. Appl. No. 10/968,487, Non-Final Office Action mailed May 5, 2009", 8 pgs.

"U.S. Appl. No. 10/968,487, Non-Final Office Action mailed Nov. 26, 2007", 10 pgs.

"U.S. Appl. No. 10/968,487, Notice of Allowance mailed Apr. 23, 2010", 11 pgs.

"U.S. Appl. No. 10/968,487, Response filed Feb. 14, 2008 to Non-Final Office Action mailed Nov. 26, 2007", 17 pgs.

"U.S. Appl. No. 10/968,487, Response filed Feb. 26, 2009 to Final Office Action mailed Nov. 26, 2009", 18 pgs.

"U.S. Appl. No. 10/968,487, Response filed Mar. 24, 2010 to Final Office Action mailed Nov. 24, 2009", 14 pgs.

"U.S. Appl. No. 10/968,487, Response filed May 9, 2007 to Non-Final Office Action mailed Jan. 9, 2007", 15 pgs.

"U.S. Appl. No. 10/968,487, Response filed Jul. 9, 2009 to Non Final Office Action mailed May 5, 2009", 14 pgs.

"U.S. Appl. No. 10/968,487, Response filed Aug. 20, 2008 to Restriction Requirement mailed Jul. 24, 2008", 13 pgs.

"U.S. Appl. No. 10/968,487, Response filed Aug. 24, 2007 to Restriction Requirement mailed Jul. 27, 2007", 10 pgs.

"U.S. Appl. No. 10/968,487, Restriction Requirement mailed Jul. 24, 2008", 7 pgs.

"U.S. Appl. No. 10/968,487, Restriction Requirement mailed Jul. 27, 2007", 6 pgs.

"U.S. Appl. No. 11/228,757, Examiner Interview Summary mailed Jul. 1, 2010", 3 pgs.

"U.S. Appl. No. 11/228,757, Final Office Action mailed Aug. 10, 2009", 18 pgs.

"U.S. Appl. No. 11/228,757, Non-Final Office Action mailed Jan. 25, 2010", 19 pgs.

"U.S. Appl. No. 11/228,757, Non-Final Office Action mailed Jan. 28, 2009", 16 pgs.

"U.S. Appl. No. 11/228,757, Notice of Allowance mailed Aug. 31, 2010", 5 pgs.

"U.S. Appl. No. 11/228,757, Notice of Allowance mailed Oct. 15, 2010", 4 pgs.

"U.S. Appl. No. 11/228,757, Response filed May 7, 2009 to Non Final Office Action mailed Jan. 28, 2009", 11 pgs.

"U.S. Appl. No. 11/228,757, Response filed Jun. 25, 2010 to Non Final Office Action mailed Jan. 25, 2010", 10 pgs.

"U.S. Appl. No. 11/228,757, Response filed Nov. 10, 2009 to Final Office Action mailed Aug. 10, 2009", 10 pgs.

"U.S. Appl. No. 12/187,191, Preliminary Amendment filed Sep. 9, 2008", 12 pgs.

"U.S. Appl. No. 12/187,191, Response filed Dec. 17, 2010 to Restriction Requirement mailed Nov. 24, 2009", 11 pgs.

"U.S. Appl. No. 12/187,191, Restriction Requirement mailed Nov. 24, 2010", 6 pgs.

"U.S. Appl. No. 11/228,757 Notice of Allowance mailed Oct. 15, 2010", 5 Pgs.

"European Applicaion Serial No. 05812506.3, Office Action mailed Dec. 9, 2009", 4 pgs.

"European Application Serial No. 05812506.3, Examination Report mailed Mar. 10, 2009".

"European Application Serial No. 05812506.3, Office Action mailed Jun. 15, 2009", 8 pgs.

"Taiwan Application Serial No. 095134143, Office Action mailed Jul. 14, 2010", 1 page.

"Taiwanese Application Serial No. 094136598, Office Action mailed Apr. 26, 2007", 7 pgs.

"U.S. Appl. No. 12/187,191, Final Office Action mailed Nov. 30, 2011", 13 pgs.

"European Application Serial No. 06803548.4, Office Action mailed Dec. 29, 2011", 5 pgs.

"European Application Serial No. 06803548.4, Response filed Nov. 18, 2011 to Office Action mailed Jul. 14, 2011", 11 pgs.

"Japanese Application Serial No. 2008-531301, Office Action Response filed Dec. 26, 2011", 5 pgs.

"Japanese Application Serial No. 2008-531301, Examiners Decision of Final Refusal mailed May 29, 2012", With English Translation, 6 pgs.

* cited by examiner

SYSTEM AND METHOD FOR ALLOWING COPYING OR DISTRIBUTION OF A COPY PROTECTED SIGNAL

RELATED APPLICATIONS

This application is a continuation of and claims the benefit of priority under 35 U.S.C. §120 to U.S. patent application Ser. No. 11/228,757, filed Sep. 16, 2005, which claims the benefit of priority under 35 U.S.C. §120 and is a continuation-in-part of U.S. patent application Ser. No. 10/968,487 filed Oct. 19, 2004, each of which are incorporated by reference herein in its entirety.

BACKGROUND

1. Field of the Invention

This invention is related to content control systems or copy protection signals.

2. Related Art

Currently, a video or media device such as a DVD player may contain trigger bits to activate at least one of many conventional types of copy protection signals, copy inhibit signals, or data signals used for content control. These trigger bits are encoded or inserted in the DVD disk, which then commands a circuit in the DVD player to appropriately apply at least part of the copy protection signal or data signal to its media/video output. Depending on the trigger bits' value, a level of copy protection is added to the video output of the DVD. However, it may desirable for rights owners, such as movie studios, to insist that copy protection or copy inhibit signals are on (i.e. trigger bits are set) all the time unless otherwise authorized. It should be noted that one would still be able to play back the media, but not make a copy of it. For example, if a library or the like is concerned that media can be easily copied, the library can distribute all media with copy protection signals or copy inhibit data signals active such that the borrower may not make a copy without authorization. Such authorization may require the borrower to communicate to the library to retrieve an access code or authorized command for the media/video player to turn off the copy protection signals or copy inhibit signals. Thus, in some circumstances, it is necessary to have the flexibility to disable a copy protection signal or copy inhibit data signal that has been triggered active by default. Existing copy protection systems do not provide this level of flexibility.

BRIEF DESCRIPTION OF DRAWINGS

The present invention is illustrated by way of example and not limitation in the figures of the accompanying drawings, in which.

DETAILED DESCRIPTION

Figure 1A:
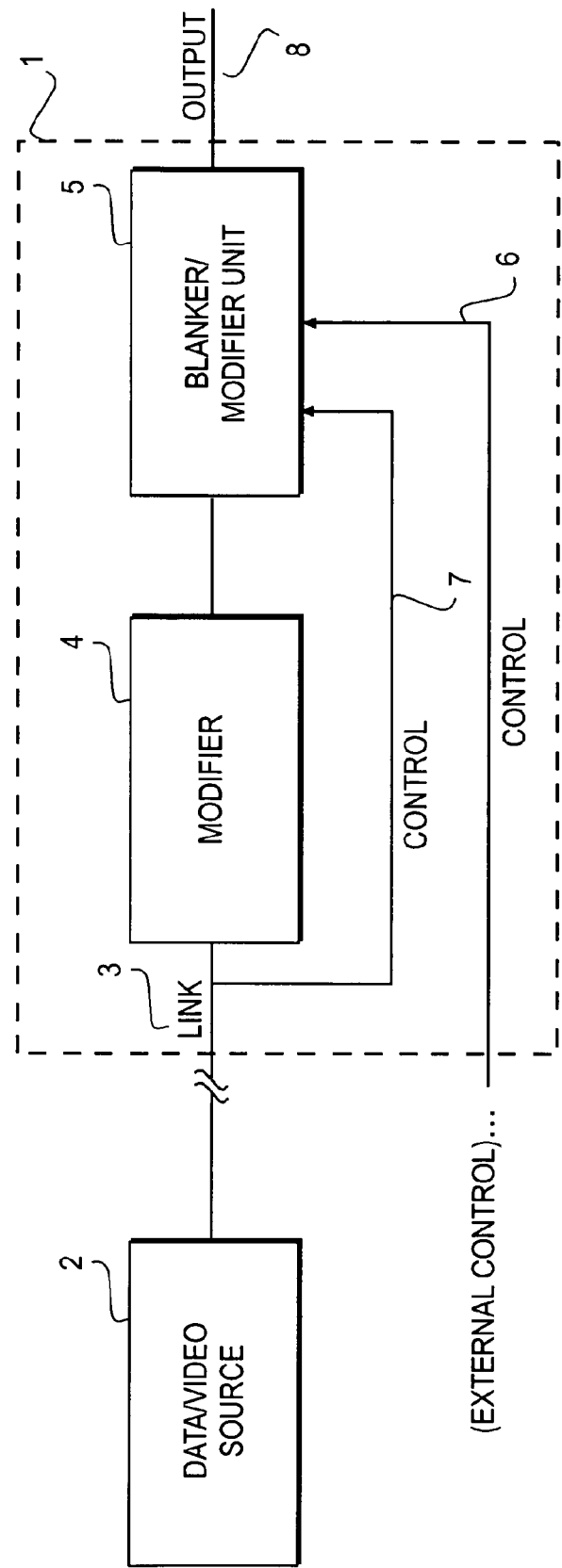
FIG. 1A illustrates in general an embodiment of the invention wherein the data or video source is coupled to a first modifier (e.g., copy protection signal and/or content control signal processor.)

A copy protection system and method for allowing copying or distribution of a copy protected signal is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, circuits, processes and interfaces have not been shown or described in detail in order not to unnecessarily obscure the present invention.

In one embodiment of the invention, a copy protection signal or part thereof, or a copy inhibit signal is set as a default output condition with media such as a video signal. To reduce the copy protection effectiveness or to allow copying or distribution, blanking bits or the like are required. An example of the blanking bits or authorization bits may be a digital and/or an analog signal applied to the media player or the recorded media. As used herein, blanking or modification bits can be implemented as one or more bits used to signal the elimination or modification of a copy protection and/or content control signal.

In an example for DVD media, a new type of DVD player may contain a blanking or muting circuit, which removes or reduces an effect of the copy protection signal or copy inhibit data signal (either of these signals may be construed as a content control signal). This blanking or muting circuit may receive a command via information on the DVD or from an external source to, for example, allow copying or distribution.

The external source may be a local or remote signal source that provides a signal to allow authorization to modify the content control signal or the copy protection. For example, a particular alphanumeric and/or numeric sequence may be entered via the front panel or remote control of the DVD player to allow the DVD player to output a signal, which allows authorized copying or distributing. In another embodiment, the DVD player may have an external signal input, such as a data line input, to receive the authorized information to modify the content control bit(s). Such a data line input includes a wired or wireless network connection, telephone line connection, Ethernet connection, and/or the like. In another embodiment, the external signal source may provide signals, such as a blanking bit or blanking bits, that may be transmitted optically, electronically, sonically, or otherwise via a remote control or transmitter.

One further example of one embodiment is that the authorization code to the DVD player may be time-limited or play-limited. For example, the DVD player may only be authorized to turn off a copy protection signal or a content control signal for the duration of one movie interval. After that, the content control signals turn back on (i.e. the suppression of the content control signals is deactivated). For example, if the movie is played a second time, the copy protection signal and/or content control signal is turned back on (i.e. the suppression of the content control signals is deactivated). Alternatively, keystrokes and/or operational functions are monitored in the DVD such that when a movie is played fully, a copy protection signal and/or content control signal that was suppressed is turned back on.

To summarize, in various embodiments of the present invention, the copy protection (or content control) signal is typically permanently enabled so that the DVD player (which may include an existing DVD player) will output a copy protection or content control signal by default. One embodiment of the present invention includes a blanking (or modifying) circuit, which may reside in the DVD player (or in a media player) and which is activated via control signals on the disk or via a blanking signal. When activated, the blanking circuit authorizes recording of the DVD content by turning off any or all of the copy protection (or content control) signal(s). The blanking signal may be provided from an external source, such as the Internet or any other type of external source or communication medium, such as a remote control device, player keypad, voice activation, telephone line, wired or wireless data lines, electrical or sonic transmission, or the like.

In another embodiment of the present invention, the embodiment builds upon an implementation disclosed in a U.S. Patent Application entitled, "A Method and Apparatus for Storing Copy Protection Information Separately from Protected Content", filed Oct. 19, 2004, assigned to the same assignee as the present invention, and assigned U.S. Ser. No. 10/968,487. The referenced U.S. Patent Application states in its specification, "In one embodiment, the file 109 is a digitized analog copy protection waveform that can be conveniently added to a digital content file 107." It is an object of the present invention to expand on this previously disclosed invention in that a content control signal or copy protection signal is carried throughout the analog and/or digital domains. Such a content control signal or copy protection signal has the advantage of being an easily changeable or updateable waveform, which can optimize playability and/or effectiveness on, for example, a display device and/or a recorder. This is distinguished from the conventional implementation of copy protection in a DVD or Set Top box, wherein a fixed copy protection process is stored in the player or box.

In another embodiment, it is possible to deploy a compression (and/or an analog to digital converter) method on the video signal which allows digitizing video signal levels below a blanking level. This way, copy protection signals that include pseudo sync or sync like signals may be carried from the analog and digital domains. With the copy protection signals originating in an analog or digital form, a DVD player does not necessarily require a copy protection generator, and the copy protection signal may be changed at a duplication house or the like for more optimal effectiveness and/or playability.

In another embodiment, copying is allowed by providing a blanking or modifying circuit (or equivalent) within the media player (e.g., DVD player, set top box, video on demand, or the like). This blanking or modifying circuit and process essentially enables the reduction of at least some effectiveness of the content control signal or copy protection signal, for example, so as to allow for copying or distributing. This modifying (blanking) method or apparatus may work in the analog, digital, and/or software domain. Modifying may include replacing/adding/inserting a waveform or voltage signal to at least a portion of the (copy protected or content control) video/data signal.

In another embodiment, a data or video signal contains at least part of a copy protection signal or a content control signal. Authorization for copying or distributing the data or video signal is provided via a modification circuit or method. This modification circuit or method includes a blanking or modification circuit. Control of the modification circuit or method is done via modifying or blanking bit or bits.

In another embodiment, a data or video signal coupled to a content control or copy protection signal generator is further coupled to a blanking or modifying circuit. Normally, the blanking or modifying circuit is off. When the blanking or modifying circuit is off, the content control or copy protection signal generator is active to combine a content control or copy protection signal with the data or video signal. The blanking or modifying circuit can be activated via blanking or modifying information to cause the modification of at least a part of the content control or copy protection signal. Alternatively, the blanking or modifying circuit can be activated via blanking or modifying information to cause the content control or copy protection signal generator to be deactivated. The modification or suppression of the content control or copy protection signal enables the creation or distribution of a more recordable copy of the data or video signal or allows recording, distribution, or viewing thereof. For example, the data or video signal may come from any combination of a DVD or CD disk, a FireWire connection, a digital connection, an analog connection, a USB connection, a WiFi connection, or Internet Connection, wireless connection, radio or TV transmission, a set top box, or a storage medium including a hard disk, tape, optical media, and/or solid state memory. The copy protection signal may include, but is not limited to, a modification to selected sync signals or pulses, modification to blanking intervals with selected level or levels of positive and/or negative waveforms/pulses, modification to selected active video portions with selected level or levels of positive and/or negative waveforms/pulses, modification to selected portions of the video signal with selected level or levels of positive and/or negative waveforms/pulses, and/or selected addition of sync-like signals to a portion of the video signal. A copy protection signal may include those signals, which, in general, display a satisfactory picture, but deliver a lesser quality picture upon recording and playback. A copy protection signal may include a signal that causes an erroneous scan or distorted display when played back. The copy protection signal may also include, but is not limited to, a modification to selected lines to induce color distortion on a display upon playback. For example, color burst cycle modifications are provided in selected horizontal blanking intervals. Alternatively, adding at least one waveform or selected voltage level to at least a portion of selected horizontal blanking intervals of a component color channel or channels is a form of copy protection.

FIG. 1A shows a data or video signal source 2, which is coupled via link 3 to modifier 4. The data or video signal source 2 may be of digital form or alternatively in analog form. For example, if data or video signal source 2 is comprised of digital signals, these signals may come from a storage device, receiver, or transmission link such as fiber, wireless, or the like. If data or video signal source 2 is an analog source, for example, the signal may be a video signal of any of the various conventional TV standards, composite and/or component.

Modifier 4 may be an apparatus that inserts or adds a copy protection signal and/or content control signal to the signal source 2. Modifier 4 can be a (conventional) device for inserting copy protection or copy control signals into a data or video signal from signal source 2. Such devices may include one or more analog/anti copy (protection) or anti-copy processor (ACP) devices, one or more copy protection (CP) signal devices, and or one or more content control signal generators. An example of ACP (which may include at least part of a copy protection signal in the digital, analog, and or software domain) may comprise a signal modifier. This signal modifier may add or insert a waveform or signal to the data/video source, or it may modify the data/video source such as by combining any added pulses, any added copy protection signal enhancers, and or any sync modifications such as narrowing/widening or amplitude variation. ACP may include other types of copy protection processes such as those modifications related to the luma and or chroma channel. Alternatively, ACP may include a change in format structure such as lines per field or frame. So ACP is not limited to an analog copy protection process or to a copy protection process that adds or inserts a signal (e.g., alternatively, ACP may utilize deleting or attenuating or transforming at least part of the data/video source). ACP may comprise a process/modification of the data/video source that for example causes a recorder to playback a signal that causes a deviation in brightness and or stability when displayed. In any of the previously (or subsequently) mentioned ACP devices, an ACP signal or waveform may be provided by an ACP device. An example of the content control signal may be a conventional CGMS signal or a data signal or some modification to the data or video signal. Modifier 4 may be linked to a communications channel to enable the selective alteration of the copy protection signal or content control signal as required. One example of the modifier 4 is a device that adds any combination of positive and/or negative pulses (waveform or waveforms) of selected levels to a portion of the data or video signal from signal source 2. For example, added positive pulses may be automatic gain control (AGC) pulses, or the like. Alternatively, if negative pulses are added, these pulses may resemble a waveform or pulse whose level is below blanking level (or a level below blanking level, but a level higher than a sync tip level) or whose level is around a sync tip level. Modifier 4 (or ACP) is not limited to the examples above; for example, digital signals or software commands can be part of a copy protection and or content control signal. In another example, Modifier 4 (or ACP) may comprise of a signal modification device that may scale pixels in one or more directions (e.g., for content control). For example, (an amount of) warping or scaling of an image or a signal can comprise part of a content control system (e.g., as a way to convey information or command). (Modifier 5 then can offset a part of or all of the warping or scaling depending on its control signal as to set or define the amount/extent of content control.)

In general, modifier 4 is activated so that the general state of the output signal 8 includes a copy protection signal and/or content control signal. In one embodiment of the present invention, modifier 4 is coupled to blanking or modifying unit (blanker/modifier unit) 5. As described herein, blanker/modifier unit 5 is provided to modify or suppress the copy protection or content control signal inserted into the data or video signal from signal source 2 by modifier 4.

Blanker/modifier unit 5 includes functional structure and methods to change the copy protection and/or content control signal. For example, blanker/modifier unit 5 may replace an added or inserted waveform with a waveform at a different level or a different waveform. In one example, the added/inserted waveform is a positive AGC pulse. Blanker/modifier unit 5 may blank out any portion of selected AGC pulses or the blanker/modifier unit 5 may narrow, level shift, time shift, and/or time compress an AGC pulse; or blanker/modifier unit 5 may add another waveform to an AGC pulse. Such modifications described herein may be applied to any portion of the copy protection and/or content control signal.

Blanker/modifier unit 5 may also insert more normal sync pulses and/or horizontal/vertical blanking intervals into the data or video signal. For example, the copy protection signal may include a raised and/or lowered portion or portions of a back porch region, and/or modified sync pulses (e.g., sync narrowing or widening or amplitude level shifts). To reduce an effect of the example copy protection signal, the blanker/modifier unit 5 may alter at least a portion of the back porch region or alter at least a portion of selected sync pulses.

Blanker/modifier unit 5 may also be a blanking circuit, which blanks out, suppresses, or replaces a portion of the data or video signal. For example, a selected number of AGC pulses and/or pseudo sync pulses may be blanked (e.g., as to allow for a recordable copy).

As shown in FIG. 1A, the control signals 6 and 7 provided as inputs into blanker/modifier unit 5 may come from the actual signal stream, link 3 (e.g., control 7), which can "authorize" any level of modification of the copy protection and/or content control signal. Alternatively, blanker/modifier unit 5 may be controlled from an outside source (e.g., from an external signal source, such as wired or wireless network connection, telephone line connection, Ethernet connection, via a remote control or transmitter or other optical, electronic, or sonic signaling means). Control 6 or control 7 can be used to selectively command the blanker/modifier unit 5 to modify or suppress the copy protection signal and/or content control signal provided as output signal 8. It should be noted that control 6 or control 7 may contain "blanking bits" (or modification bits), for example.

Another variation of the embodiment shown in FIG. 1A is when the video signal 3 is analog. In this case, the modifier 4 may contain an analog video processor to insert or add at least one waveform to produce a copy protection signal and/or an enhancement to a basic copy protection signal. Blanker/modifier unit 5 then may be an analog "black box" in that at least a portion of the analog video copy protection signal or content control signal is modified. For example, the modification may include, but is not limited to, blanking, level shifting, sync pulse modification, modifying at least a portion of a vertical and/or horizontal blanking interval, and/or adding a waveform to a portion of the video signal. An analog black box or blanker/modifier unit 5 may include functional structure for narrowing and/or repositioning a portion of the analog video signal or regenerating one or more selected signals in the horizontal blanking interval such as selected color burst signals or selected sync pulses.

In FIG. 1A, the data or video (media) source 2 may be configured in part of a system that contains block 1 (block 1 is identified in FIG. 1A with dashed lines). In one example, data or video source 2 may be a media player or receiver combined with the functionality of block 1, which includes the functionality of modifier 4 and blanker/modifier unit 5.

Figure 1B:
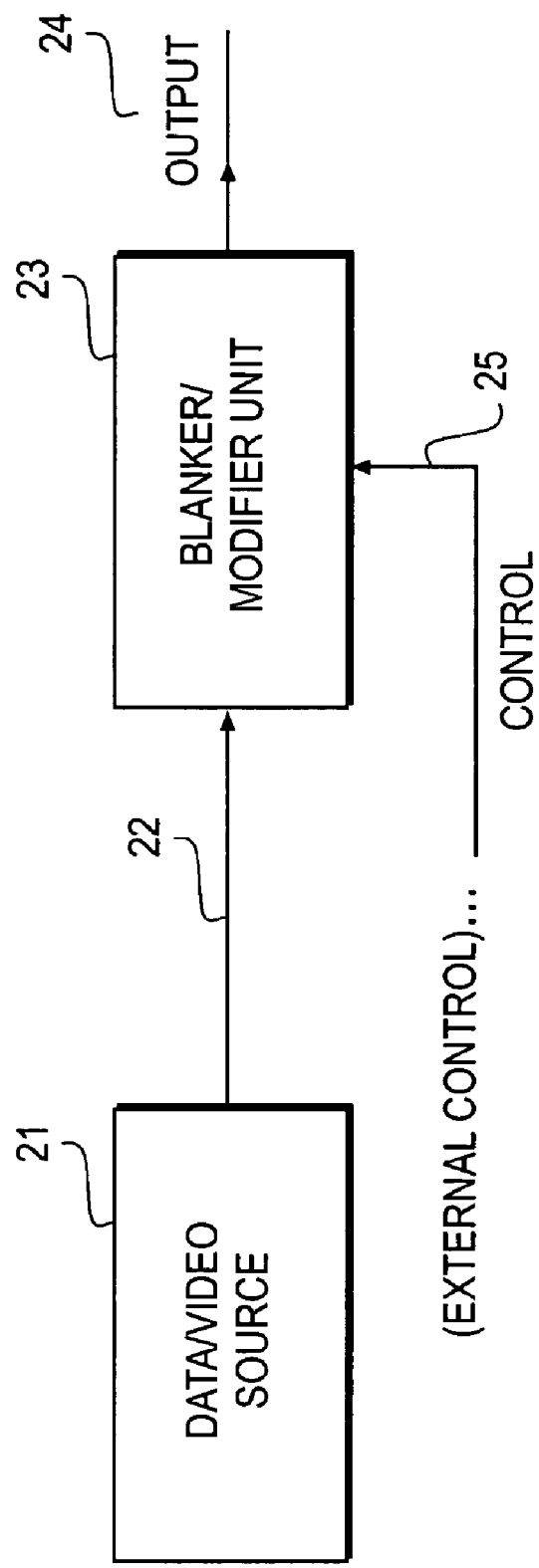
FIG. 1B illustrates another embodiment of the invention wherein the data or video source already contains a copy protection signal and/or content control signal.

FIG. 1B shows an embodiment essentially similar to the embodiment shown in FIG. 1A; but in this case, the data/video source 21 has already integrated or combined the video/data (media) signal with a copy protection and/or content control signal. As shown in FIG. 1B, data/video source 21 may include those features described above for data/video source 2 and/or modifier 4 as shown in FIG. 1A and described above. The combined video/data signal and copy protection and/or content control signal is provided by data/video source 21 as signal 22. Source 21 is coupled via signal 22 to blanker/modifier unit 23. Blanker/modifier unit 23 of FIG. 1B may include the features described above for blanker/modifier unit 5 of FIG. 1A. Blanker/modifier unit 23 may be configured to receive a control signal 25, which can be an external input similar to control signal 6 illustrated in FIG. 1A and described above. Further, because blanker/modifier unit 23 is coupled to signal 22, blanker/modifier unit 23 can be configured to receive modification bits or blanking bits from signal 22.

These modification bits or blanking bits can be used to control the operation of blanker/modifier unit 23. In particular, the blanker/modifier unit 23 can be controlled using control 25 and/or blanking bits from signal 22 to selectively modify or suppress the copy protection and/or content control signal output as signal 24. In blanker/modifier unit 5 or 23, one or more control inputs may be used to control the blanker/modifier unit.

Figure 1C:
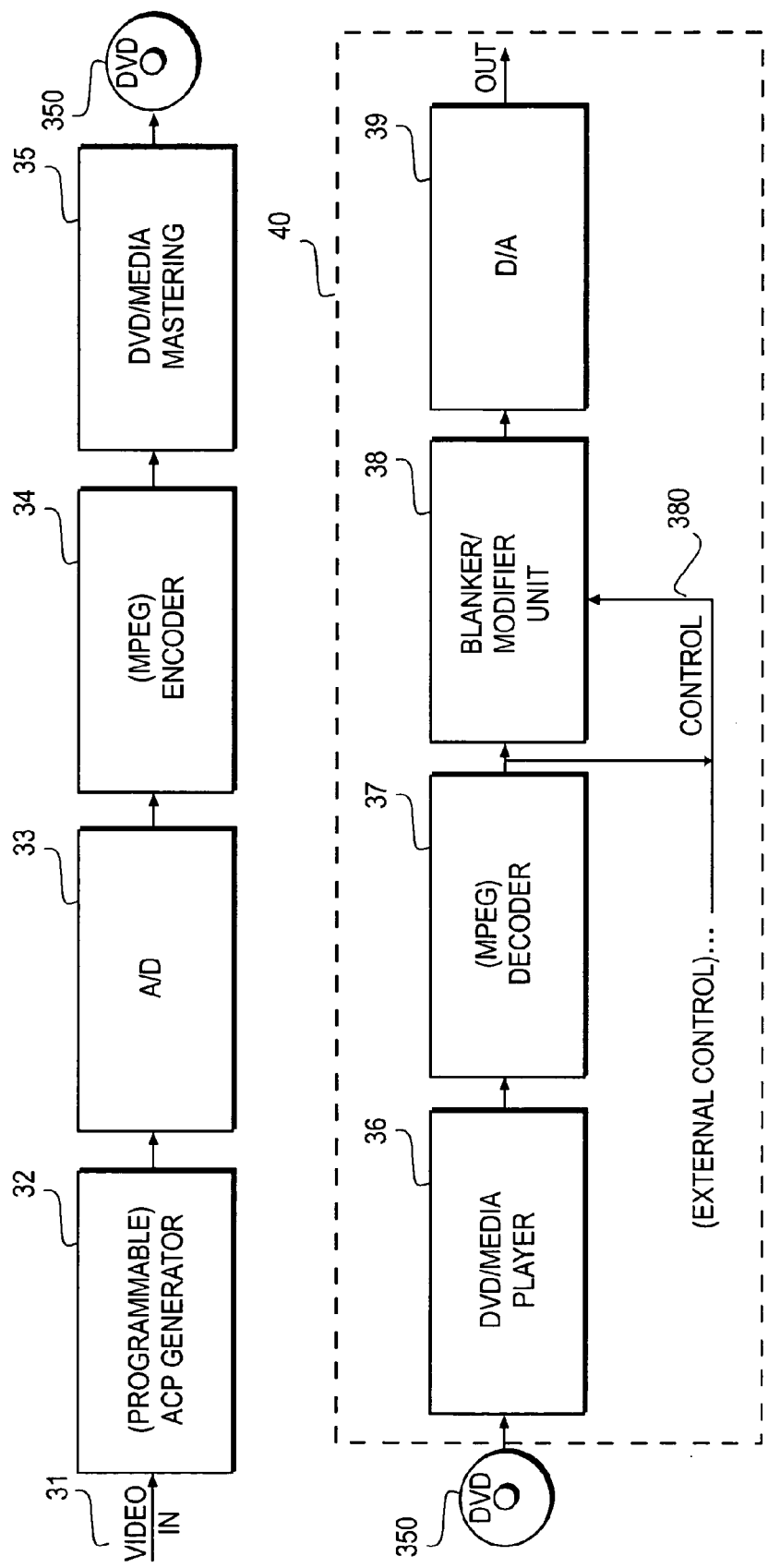
FIG. 1C illustrates an example embodiment wherein a changeable copy protection signal and/or content control signal is carried throughout the analog and digital domains, and wherein a modifier is used, for example, to alter a copy protection and/or a content control effect.

FIG. 1C shows another embodiment of the present invention wherein an analog video program source 31 is coupled to an ACP generator 32. Generator 32 then adds or inserts at least a modification to the video source 31. As previously described (e.g., in FIGS. 1A or 1B), generator 32 may modify a sync pulse or signal. Generator 32 may modify a particular portion or portions of a video signal. Alternatively, generator 32 may modify a horizontal/vertical blanking interval (e.g. AGC and/or pseudo sync pulses and/or color channel modifications such as a color burst or equivalent in the component domain and/or a portion of a back porch), and/or add/insert a sync like pulse or waveform. Generator 32 may also generate a data or content control signal.

As shown in FIG. 1C, the output of generator 32 is coupled to an analog to digital (A/D) converter 33. Converter 33 is coupled to an encoder 34 (e.g., MPEG or data compression). The output of encoder 34 is coupled to a recorder or mastering device 35 to provide a recorded copy of the video program 31 combined with an embedded copy protection and/or content control signal on recorded media 350. This content-protected video program copy can be stored on various types of recordable media 350.

The recorded copy 350 can be played back via an embodiment of the present invention shown in FIG. 1C as block 40 (shown as including the functional components within the dashed lines). Block 40 contains a DVD/media player 36 coupled to a decoder 37. Decoder 37 contains the digitized version of video program 31 plus the digitized version of the copy protection and/or content control signal. The output of decoder 37 is coupled to a blanker/modifier unit 38. Blanker/modifier unit 38 may receive a control signal 380. Control signal 380 can be sourced from the output of decoder 37 or from an external source. Blanker/modifier unit 38 may be configured to receive the control signal 380, which can be similar to control 7 or similar to the external input signal 6 illustrated in FIG. 1A and described above. The output of the blanker/modifier unit 38 is coupled to a digital to analog (D/A) converter 39, which outputs an analog video signal. In one example, control 380 is generally (typically by default) turned off (inactive), which causes blanker/modifier unit 38 to be inactivated. When inactivated, blanker/modifier unit 38 retains (i.e. leaves intact) the copy protection and/or content control signal(s) provided as input to D/A converter 39. As a result, the output of converter 39 includes the analog version of the copy protection and/or content control signal(s).

If it is desired to modify or suppress the copy protection and/or content control signal(s), control 380 receives modification or blanking bits from an internal or external source to selectively command the blanker/modifier unit 38 to alter the copy protection and/or content control signal. For example, the blanking bits can be set to allow or prevent recording, or to set conditions on recording or distributing. The altered or suppressed copy protection and/or content control signal(s) is provided as input to D/A converter 39. The output of converter 39 includes the analog version of the altered or suppressed copy protection and/or content control signal(s).

Figure 1D:
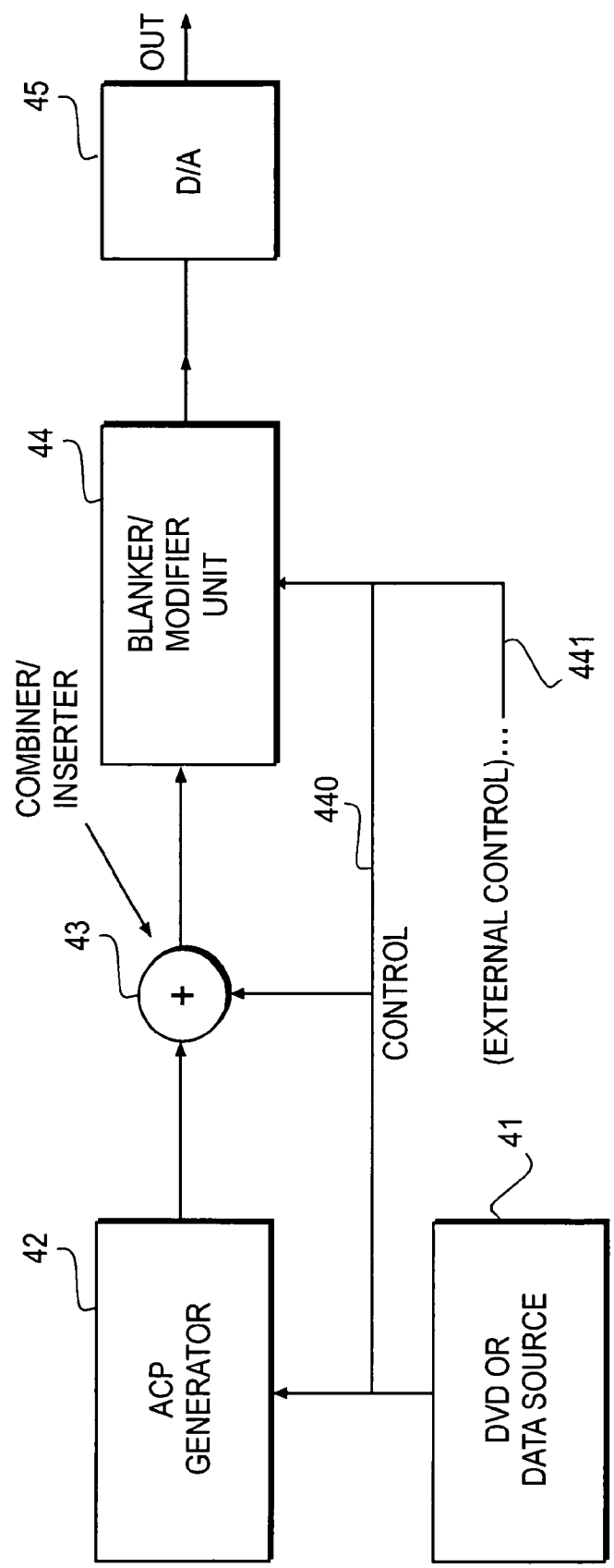
FIG. 1D illustrates an example embodiment comprising an anti-copy processor along with a combiner and modifier.

FIG. 1D illustrates another embodiment wherein a DVD or data source 41 is coupled to an anti-copy protection generator 42. The DVD or data source 41 corresponds to any of a variety of well-known devices that provide a video signal from an optical or magnetic media source, a memory device, a receiver, and or a networked data source. The output of anti-copy protection generator 42 contains at least one pulse or waveform that is combined via combiner/inserter 43 with the signal output of DVD or data source 41. The output of combiner/inserter 43 is coupled to blanker/modifier unit 44. Blanker/modifier unit 44 of FIG. 1D may include the features described above for blanker/modifier unit 5 of FIG. 1A or blanker/modifier unit 23 of FIG. 1B. The output of blanker/modifier unit 44 is then coupled to a digital to analog (D/A) converter 45. Based on control input signals and/or modification bits received from an external or internal source, blanker/modifier unit 44 can selectively cause the modification or blanking out of at least a portion of the copy protection and/or content control signal provided as input to D/A converter 45. The analog version of the modified signal is output from D/A converter 45.

Blanker/modifier unit 44 may have at least one control input as shown in FIG. 1D. Control 440 is optionally coupled to the output of DVD or data source 41 to receive "authorization" information (e.g., modification bits or blanking bits). This authorization information is used by blanker/modifier unit 44 as a control input signal to selectively cause the modification or blanking out of at least a portion of the copy protection and/or content control signal provided as input to D/A converter 45. In another embodiment, blanker/modifier unit 44 can receive a control input signal 441 from an external source (e.g., from an external signal source, such as wired or wireless network connection, telephone line connection, Ethernet connection, via a remote control or transmitter or other optical, electronic, or sonic signaling means). Control input signal 441 can also be used to receive "authorization" information (e.g., modification bits or blanking bits) from an external source. Control input signal 441 is used by blanker/modifier unit 44 as a control input signal to selectively cause the modification or blanking out of at least a portion of the copy protection and/or content control signal provided as input to D/A converter 45.

Figure 2A:
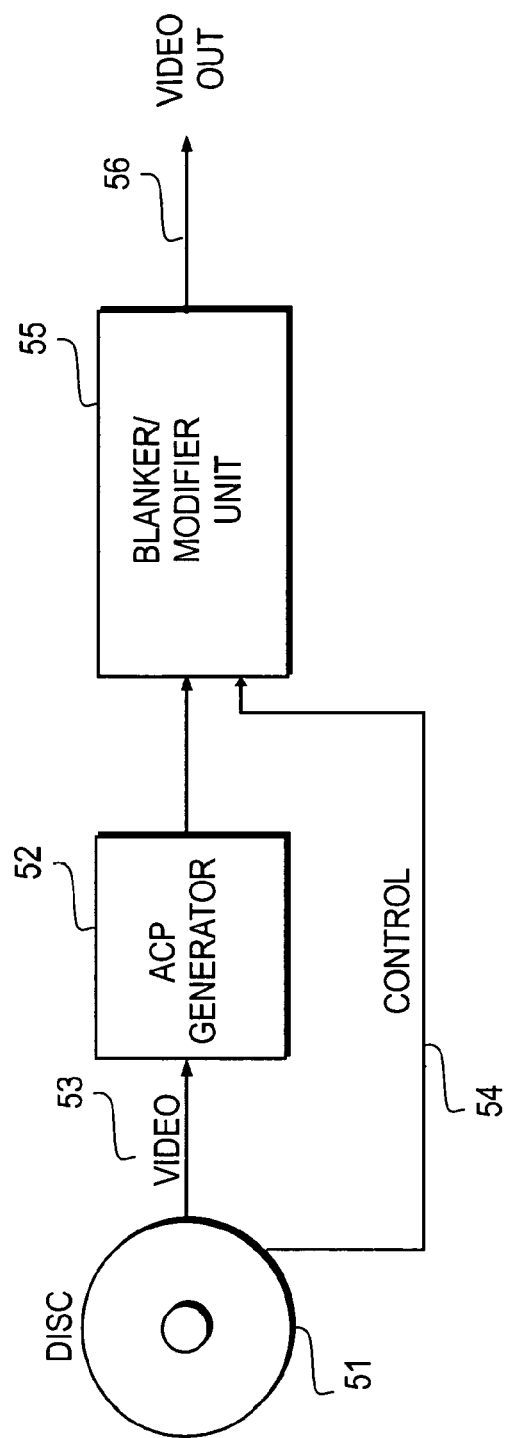
FIG. 2A shows an example embodiment comprising of a storage device (or signal stream) coupled to an anti-copy processor or inserter along with a blanker/modifier apparatus.
Figure 2B:
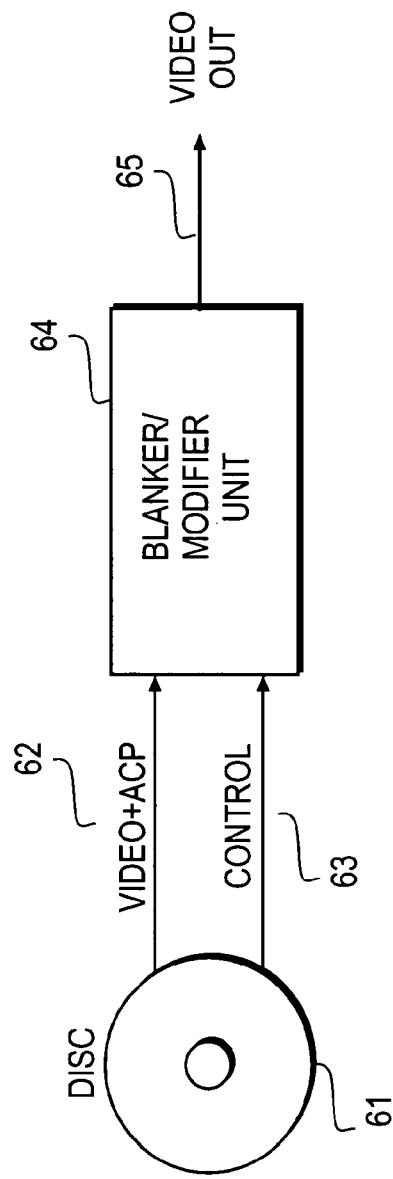
FIG. 2B shows an example comprising of a storage device (or signal stream) that contains a copy protection signal (and/or content control signal), which is then coupled to a modifying apparatus.

As shown in FIGS. 2A and 2B and described in more detail below, the ACP signal in a video signal may be always on (active) via the stored media (e.g. an optical disc) alone (FIG. 2B) or via the stored media as coupled to an ACP generator 52 (FIG. 2A). Instructions to turn off (or to modify) at least part of the ACP signal, which can include actively removing the ACP signal, can be passed through a control line to blanker/modifier unit 55 (FIG. 2A) or blanker/modifier unit 64 (FIG. 2B).

FIG. 2A shows a disc 51 (e.g., DVD or other media such as optical disc, tape, solid state memory, hard drive, etc.), which contains video information 53. Video information 53 is coupled to an ACP generator 52. ACP generator 52 generates a copy protection signal which is combined with or modifies video signal 53. The output of ACP generator 52, which contains a copy protection signal, is coupled to (provides an input to) a blanker/modifier unit 55. A control signal 54 is also provided by disc 51. This control signal 54 is coupled to an input of blanker/modifier unit 55. The output of blanker/modifier unit 55 will normally (by default) output a video signal with copy protection inserted when control bits of control signal 54 are not activated (e.g., no modification and/or no blanking) If a predetermined configuration of control bits are activated via control signal 54 (e.g., from the disc 51), at least a portion of the video and/or copy protection signal will be modified or blanked by blanker/modifier unit 55.

For example, the control bits of control signal 54 may signal the removal of all or a portion of the copy protection signal from the output of ACP generator 52. The output 56 then would allow for a recordable copy of the video signal for distribution if, for example, the control bits of control signal 54 were set to remove or modify (or remove or modify sufficiently) the copy protection signal inserted by ACP generator 52.

FIG. 2B illustrates another embodiment showing a media disc 61 (e.g., DVD or other media such as optical disc, tape, solid state memory, hard drive, etc.) that has a video signal combined with an ACP signal, denoted as signal 62 in FIG. 2B. Signal 62 is coupled to (provided as an input to) a blanker/modifier unit 64. Blanker/modifier unit 64 also receives a control signal 63 as an input. Control signal 63 causes blanker/modifier unit 64 to selectively modify or blank out at least a portion of the copy protection (ACP) signal component of signal 62. The default condition for the control signal 63 is to cause blanker/modifier unit 64 to apply no modification and/or no blanking so that the ACP signal component of signal 62 is passed to the video output 65. If a predetermined configuration of control bits are activated via control signal 63 (e.g., from the disc 61), at least a portion of the ACP signal component of signal 62 will be modified or blanked by blanker/modifier unit 64 and provided as output 65. The modified/blanked signal provided as output 65 would allow for a recordable copy of the video signal or for distributing the video signal.

Thus, a copy protection (or content control) system and/or method for allowing copying or distribution of a copy protected signal (or content control) is disclosed. The above description is illustrative and not limiting; further modifications will be apparent to one of ordinary skill in the art in light of this disclosure.

What is claimed is:

1. An apparatus providing modification to a digital content signal, the apparatus comprising:
    a WiFi communications channel for receiving a digital content signal, the digital content signal including a control signal; and
    a modifying circuit coupled with the WiFi communications channel, the modifying circuit generating an analog copy protection signal based on the control signal, the control signal causing the modifying circuit to add or delete the analog copy protection signal to or from the digital content signal and produce a resulting modified analog content signal.

2. The apparatus of claim 1 wherein the modifying circuit scales an image embodied in the digital content signal or scales pixels in one or more directions of the image.

3. The apparatus of claim 1 wherein the analog copy protection signal includes any combination of positive and/or negative going pulses or waveforms, automatic gain pulses, negative going pulses below a blanking level of an analog video signal, and or color burst cycle modification.

4. The apparatus of claim 1 wherein the analog copy protection signal operates to apply a limitation of play time or a number of plays of the digital content signal.

5. The apparatus of claim 1 including a wired communications channel for receiving the digital content signal, the digital content signal including the control signal, the modifying circuit being coupled with the wired communications channel, the modifying circuit generating the analog copy protection signal based on the control signal, the control signal causing the modifying circuit to add or delete the analog copy protection signal to or from the digital content signal received via the wired communications channel.

6. The apparatus of claim 1 including a storage device.

7. The apparatus of claim 1 including a blanking circuit to remove at least a portion of the analog copy protection signal from the digital content signal.

8. A method for providing modification to a digital content signal, the method comprising:
    receiving a digital content signal via a WiFi communications channel, the digital content signal including a control signal; and
    using a modifying circuit coupled with the WiFi communications channel to generate an analog copy protection signal based on the control signal, the control signal causing the modifying circuit to add or delete the analog copy protection signal to or from the digital content signal and produce a resulting modified analog content signal.

9. The method of claim 8 including using the modifying circuit to scale an image embodied in the digital content signal or to scale pixels in one or more directions of the image.

10. The method of claim 8 wherein the analog copy protection signal includes any combination of positive and/or negative going pulses or waveforms, automatic gain pulses, negative going pulses below a blanking level of an analog video signal, and or color burst cycle modification.

11. The method of claim 8 wherein the analog copy protection signal operates to apply a limitation of play time or a number of plays of the digital content signal.

12. The method of claim 8 including receiving the digital content signal via a wired communications channel, the content signal including the control signal, and using the modifying circuit coupled with the wired communications channel to generate the analog copy protection signal based on the control signal, the control signal causing the modifying circuit to add or delete the analog copy protection signal to or from the digital content signal received via the wired communications channel.

13. The method of claim 8 including storing information in a storage device.

14. The method of claim 8 including using a blanking circuit to remove at least a portion of the analog copy protection signal from the digital content signal.

* * * * *